(No Model.)
L. W. YOUNG.
HEDGE FENCE.
No. 591,717. Patented Oct. 12, 1897.
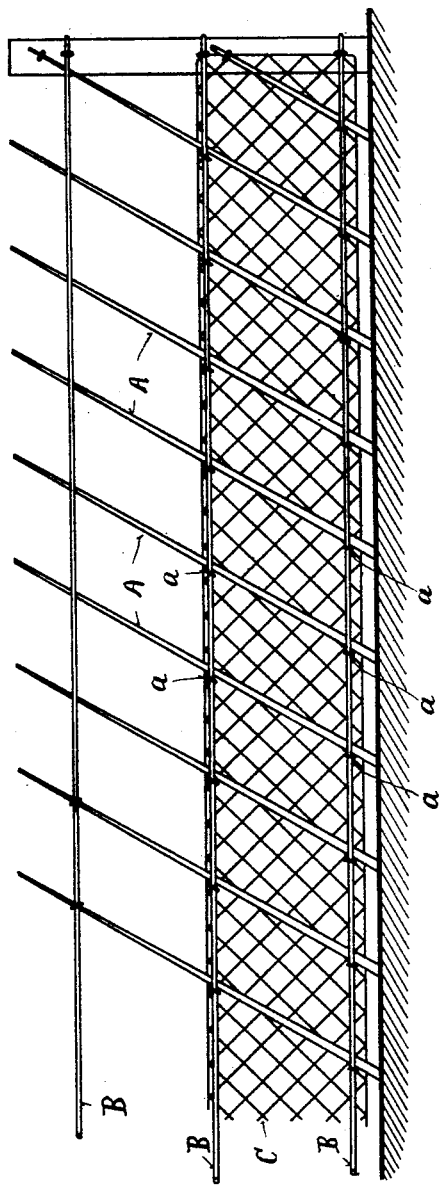
Witnesses
C. W. Miles
Oliver B. Kaiser
Inventor
Lorin W. Young
by Wood & Boyd
Attorneys

United States Patent Office.

LORIN W. YOUNG, OF DAYTON, OHIO.

HEDGE FENCE.

SPECIFICATION forming part of Letters Patent No. 591,717, dated October 12, 1897.

Application filed June 30, 1897. Serial No. 642,981. (No model.)

*To all whom it may concern:*

Be it known that I, LORIN W. YOUNG, residing at Dayton, in the county of Montgomery and State of Ohio, have invented certain new and useful Improvements in Hedge Fences, of which the following is a specification.

The object of my invention is to provide means for plashing a hedge fence by trimming off only a portion of the twigs or branches and to provide a wire-netting along the lower portion, which performs two important functions. One is to furnish a barrier against the passage of animals, and the other is to furnish a superior means for holding the plant in position, the features of which are more fully set forth in the description of the accompanying drawing, making a part of this specification, in which the figure is a side elevation of my improved hedge fence.

B B B represent a series of horizontal wires stretched along one side of a line of hedge plants.

C represents a wire webbing or netting.

The hedge is constructed as follows: A plant A is inclined, and the netting is secured to the horizontal wires by twisted eye-loops $a$, which embrace the netting and horizontal wires. These eyes are just in rear of the inclined plants, and they serve to hold the plants in their inclined position without tying or stapling around the plants or nailing through them. Either of these old ways injures the plant more or less and interferes with the growth. The twigs or branches may be trimmed off of the plants to the height of the wire-netting, which is preferably to the second horizontal wire. The tops of the plants are preferably tied to the top horizontal wire. The netting being on one side of the plants and the horizontal wires on the other side, the plants are held in position, and when the branches grow out along the base they engage with the netting and anchor the plants firmly in position.

Several important advantages are obtained by this method of plashing a hedge fence. The webbing and horizontal wires being upon opposite sides of the plant hold them in position laterally, the ties which secure the horizontal wires to the netting, being in rear of the plants, holding them at the proper inclination in a manner non-injurious to the plants. Hedges may be plashed and make a good fence when they are only two years old, while with the methods hitherto employed they have to be at least four years old or even older. Again, only a portion of the branches are required to be trimmed off, and hence the growth of the plant is not retarded materially by plashing and plants can be plashed all summer, which could not be done with the old ways, where all the branches were trimmed off. There is no injury to the plants by stapling the plants to supporting-wires. The netting forms a barrier along that portion where the limbs have been trimmed off, and a good hedge fence can be obtained several years sooner than by the methods hitherto employed.

Having described my invention, I claim—

1. A plashed hedge fence consisting of a line of plants supported between a series of horizontal wires on one side, and a wire-netting on the other side, fastening-ties securing the netting to the horizontal wires in rear of the inclined plants, substantially as specified.

2. A plashed hedge fence composed of a series of horizontal wires and a wire-netting tied to the horizontal wires, a line of plants between said horizontal wires and netting and supported thereby, substantially as specified.

3. A plashed hedge fence consisting of a series of horizontal wires, a strip of netting connected to the two lower horizontal wires, hedge plants inclined between said wires and netting and held by the horizontal wires on one side and the engagement of the branches along the base of the plants with the wire-netting on the opposite side, substantially as specified.

In testimony whereof I have hereunto set my hand.

LORIN W. YOUNG.

Witnesses:
C. R. CAMERON,
WESLEY YOUNG.